T. E. GEIGER.
STEERING DEVICE FOR VEHICLES.
APPLICATION FILED NOV. 10, 1917.
1,262,771.
Patented Apr. 16, 1918.
2 SHEETS—SHEET 1.
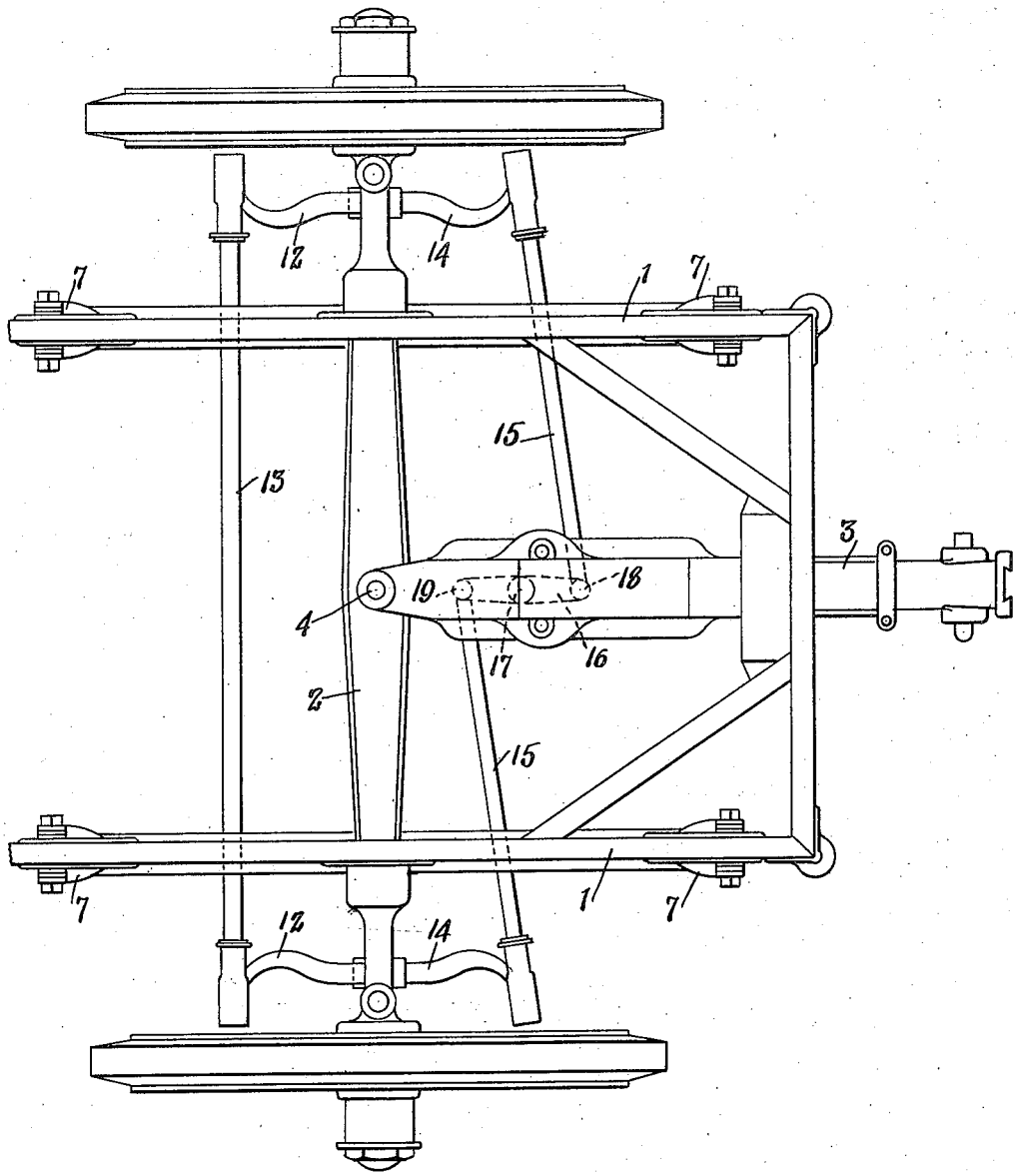
Inventor
Tracey E. Geiger,
Attorneys

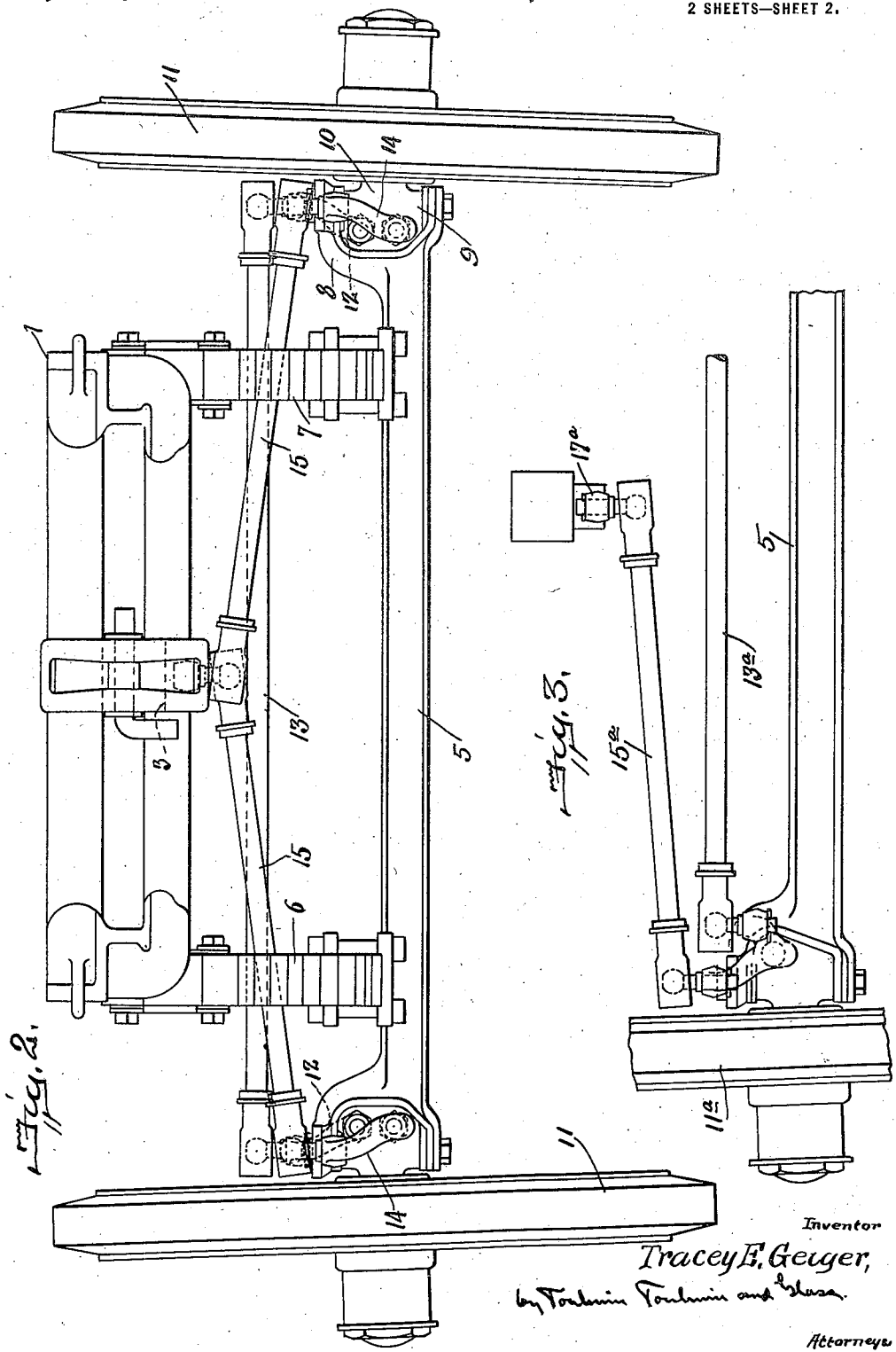

UNITED STATES PATENT OFFICE.

TRACEY E. GEIGER, OF TROY, OHIO, ASSIGNOR TO THE TROY WAGON WORKS COMPANY, OF TROY, OHIO, A CORPORATION OF OHIO.

STEERING DEVICE FOR VEHICLES.

1,262,771.        Specification of Letters Patent.        Patented Apr. 16, 1918.

Application filed November 10, 1917. Serial No. 201,274.

*To all whom it may concern:*

Be it known that I, TRACEY E. GEIGER, a citizen of the United States, residing at Troy, in the county of Miami and State of Ohio, have invented certain new and useful Improvements in Steering Devices for Vehicles, of which the following is a specification, reference being had therein to the accompanying drawing.

This invention relates to steering devices for vehicles and is especially adapted to trailing trucks attached to automobiles. Such trucks are in general use and the prior art shows forms of steering construction for them which have been found open to certain defects in practice. In most cases the general method of steering ordinarily employed in automobiles is used, this comprising the mounting of the steering wheels on steering knuckles which are pivoted to yoke shaped ends of a fixed axle. Steering arms are fast to these knuckles and are connected by a tie bar. At one end of the tie bar the ordinary drag link is applied, this usually being positioned nearly in line with the longitudinal movement of the vehicle and being controlled by a steering wheel or other form of device.

In the trailing truck, however, the conditions are somewhat different inasmuch as the steering must be done by the leading vehicle. Thus, the prior art shows the employment of draft bars pivoted to the frame of the trailing truck and connected in some manner to the leading automobile. In some such trailing trucks the same method of mounting the steering wheels on the knuckles is employed and the steering arms are connected by separate drag links to the drag bar, the connection being at some point more or less distant from the pivot of the draft bar to the truck frame.

The great difficulty found with this type of construction is that the vehicle frame is compelled sometimes to have a movement relative to the axle, this movement being caused either by placing a load on the truck and thus depressing the frame against the resistance of the supporting springs or by the wheels striking obstructions or running over uneven ground.

When such relative movement between the truck frame and the axle occurs the prior construction was defective in that the two drag links had practically the effect of a toggle and thus tended to turn the two steering wheels in opposite directions. Obviously, this produced a very bad condition and was otherwise objectionable.

The present invention aims to improve the former defective constructions by employing the two drag links of the previous construction but connecting these to the draft bar through an intermediate drag rocker. In addition a tie bar connecting the two wheels is employed and the result of these two devices is that the wheels are maintained in their normal relation to each other irrespective of the relative movement of the truck frame and the axle.

With this general statement of the nature of the invention the detailed description may be given with reference to the drawings, in which Figure 1 is a plan view of a portion of a vehicle frame showing the invention applied thereto;

Fig. 2 is a front elevation thereof; and

Fig. 3 is a detail in the nature of a modification, but showing somewhat in diagram the scope of the invention.

In Fig. 1 the truck frame 1 includes a cross bar 2 to which the draft bar 3 is pivoted as by a bolt or pin 4. The cross bar 2 is shown as directly over the axle 5 and the axle is, as usual, connected through springs 6 and spring shackles 7 to the truck frame. Thus the frame is supported from the springs as usual and may have more or less vertical movement relative thereto when a load is placed on the truck or when the wheels strike obstructions or uneven ground. Also the provision of the spring shackles 7 at each end of the springs permits more or less relative movement of the wheels and the frame in the direction of movement of the vehicle.

The axle 5 ends in the steering yokes 8 and these yokes support steering knuckles 9 which may be of any desired construction. Fast to them are the spindles 10 on which the wheels 11 are mounted.

In Fig. 1 the steering knuckles 9 are shown as having fast therewith arms 12 projecting rearwardly and having their outer ends connected by a tie bar 13. It will be seen that the tie bar 13 is thereby given nearly a parallel motion and is at all times maintained generally parallel with the axle 5. It serves to compel the two steering knuckles 9 to rotate as usual around the ends of the axle 5 and thereby maintain the wheels 11 in proper relation to each other at all times.

Also connected to the steering knuckles 9 are forwardly extending steering arms 14, these being pivoted at their outer ends to drag links 15. Any desired form of connection between the drag links and the steering arms may be employed and the same statement may be made of the connection between the parallel arms 12 and the tie rod 13. In ordinary practice a ball and socket type of connection is employed and that has been found to be entirely satisfactory in the present construction.

Carried on the draft bar 3 is a drag rocker 16, this being centrally pivoted at a point 17 to the draft bar 3. On opposite sides of this pivot 17, as by pins 18 and 19, the drag rocker is connected to the ends of the drag links 15. The connections referred to as pins 18 and 19 will preferably be ball and socket connections as before referred to and it will be observed in Fig. 2 that the drag links 15 have an upward inclination as they approach the draft bar 3 or in other words they meet adjacent the draft bar at an obtuse angle. This is not a necessary part of the construction, but in usual practice the truck frame, is somewhat above the wheel axles and this accounts for the inclination of the drag links 15. In Fig. 1 the vehicle is shown as moving ahead in a straight line and it will readily be understood that if it is desired to turn the truck the draft bar 3 is rotated in one direction or the other around its pivot 4 on the cross bar 2 of the frame. Such rotating movement, of course, causes an equivalent movement of the pin 17 connecting the drag rocker 16 to the draft bar and thus tends to move the drag links 15 in the same direction. Of course, the extent to which the links 15 may move is controlled by the tie bar 13 and the parallel arms 12 and therefore movement of the draft bar 3 causes more or less rotation of the draft rocker 16 around its center pivot pin 17. This turns the wheels 11 but the wheels are nevertheless maintained parallel by the tie rod 13.

In case a load is placed on the truck, thus depressing the frame relative to the axle 5, the drag links 15 act then more or less as a toggle and slightly rock the drag rocker 16 around its center pin 17 but without disturbing the parallelism of the wheels 11. In other words the pivots of the drag links 15 to the steering arms 14 remain stationary in case such a load is applied so that the pivots 18 and 19 between the drag links and the drag rocker will cause more or less rotation of the drag rocker and in the position of the parts shown such movement of the drag rocker 16 would be in a clockwise direction in Fig. 1. It will be seen that even if the frame is depressed relative to the axle the wheels are nevertheless maintained parallel to each other and yet there is in effect a positive connection between the draft bar 3 and the steering arms 14.

In Fig. 1 for clearness the tie rod 13 has been shown as connected to separate arms 12, but it will be readily seen that this tie rod may just as well connect the outer ends of the steering arms 14. Such a construction is indicated very generally and in diagram in Fig. 3 so as to make this point clear. Obviously, if the connections between arms 12 and tie rod 13 are such that these connecting ball and socket joints are maintained at the proper distance apart this relation of proper distances will also occur between the pivots of the steering arm 14 and the drag links 15. Therefore the tie rod 13 can as well connect these pivots as to be applied to the device through a separate pair of arms 12, as is shown for clearness in Fig. 1.

It will be seen that the construction described is well adapted to accomplish the objects stated inasmuch as it provides for tying the wheel holding devices together and thus compelling them to rotate properly but nevertheless permitting the vehicle frame to have movement relative to the axle either vertically or horizontally without disturbing the proper relation of the wheel holding devices and wheels. The drag links 15 form an obtuse angle but this is not at all essential to the use of the invention as they might as well be horizontal and in line with each other under normal conditions. Of course, if that relation was had it would still be true that the depression of the truck frame relative to the axle would change the angle between the drag links 15 and the construction would produce the same result as with the present construction. As the parts are shown in Fig. 1 the pivot pin 17 of the drag rocker is in the straight line joining the pivots between the drag links 15 and steering arms 14. This is of advantage in that it equalizes the movement of the drag links but it is not essential to the operation of the device.

In Fig. 3 the same reference numerals as in the other figures is used except that the suffix "a" is added to each of the numerals as compared with the numerals of the corresponding parts in Figs. 1 and 2.

It will be noted that the arms 14 are shown in Fig. 1 as extending substantially parallel to each other so that the tie bar 13 remains nearly parallel to the axle 5. In Fig. 3, however, the corresponding arms 14ª are at a small angle and thus are somewhat nearer each other as they approach their pivots to bar 13ª. It may be pointed out that either relation of arms 14 is possible with either of the constructions of Figs. 1 or 3. In usual practice the arms which connect the tie rod to the steering knuckles are positioned so as to approach each other slightly as the tie bar is approached, and thus the outer wheel is turned on a curve to a slightly greater extent than the inner wheel. The form of construction shown is designed to employ this principle of usual construction as the drag rocker permits the outer wheel to be turned on a curve to a greater extent than the inner wheel, while maintaining the positive connection between the draft bar and the wheels. The wheels are always turned so that the draft bar is the bisector of the angle they make with each other.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a vehicle, the combination, with a vehicle frame and a fixed axle having steering yokes, steering knuckles pivoted to said yokes, arms fast to said knuckles and extending rearwardly of said axle, and a tie bar connecting said arms and thus maintained generally parallel with the axle, of steering arms fast to and projecting forwardly of said knuckles, a draft bar pivoted to the vehicle frame, a drag rocker pivoted centrally of its length to said draft bar and drag links connecting said steering arms to opposite ends of said drag rocker.

2. In a vehicle, the combination, with a vehicle frame and a fixed axle having steering yokes, steering knuckles pivoted to said yokes, arms fast to said knuckles and a tie bar connecting the outer ends of said arms and thus maintained generally parallel with said axle, of steering arms fast to said knuckles, a draft bar pivoted to the vehicle frame, a drag rocker pivoted centrally of its length to said draft bar and extending substantially parallel to said bar when the vehicle moves in a straight line, and drag links connecting the opposite ends of said drag rocker to the outer ends of said steering arms.

3. In a vehicle, the combination, with a vehicle frame and a fixed axle, said axle having steering yokes, steering knuckles pivoted to said yokes, and a tie bar having connections to said yokes, causing them to move together, of a steering arm fast to said steering knuckle, a draft bar pivoted to the vehicle frame, a drag rocker pivoted centrally of its length to the draft bar, and two drag links respectively pivoted to the outer ends of said steering arms and to the opposite ends of said drag rocker.

4. In a vehicle, the combination, with a vehicle frame and a fixed axle having steering yokes, of steering knuckles pivoted to said yokes, a steering arm fast to each of said knuckles, a draft bar pivoted to the vehicle frame, a drag rocker pivoted centrally of its length to the draft bar, drag links connecting said steering arms to opposite ends of said drag rocker, and means for compelling said knuckles to rotate to equal extents around said yokes.

5. In a vehicle, the combination, with a vehicle frame and a fixed axle, of wheel holding devices pivoted to the ends of said axle, a steering arm fast to each of said wheel holding devices, a draft bar pivoted to the vehicle frame, a drag rocker pivoted centrally of its length to said draft bar, links connecting the outer ends of said drag rocker respectively to said steering arms, and means for compelling said wheel holding devices to rotate to equal extents around the ends of said axles.

6. In a vehicle, the combination, with a vehicle frame and a fixed axle, and wheel holding devices pivoted to the ends of said axle, of steering arms fast to said wheel holding devices, a draft bar pivoted to said vehicle frame, a drag rocker pivoted centrally of its length to the draft bar, drag links pivoted to the steering arms and to the drag rocker at opposite sides of its pivot on the draft bar, the pivotal point of the drag rocker to the draft bar being substantially in the straight line joining the pivots of the steering arms and the drag links, and means connecting the steering arms constructed to compel the wheel holding devices to rotate around the ends of the axle.

7. In a vehicle, the combination, with a vehicle frame and an axle, with wheel holding devices pivoted to the ends of said axle, of means for tying said wheel holding devices together and thus compelling them to rotate around the ends of said axle, a draft bar pivoted to the vehicle frame, and means connecting said wheel holding devices to said draft bars at a distance from the pivot of said draft bar to said frame.

8. In a vehicle, the combination, with a vehicle frame and an axle, and wheel holding means pivoted to the ends of said axle, of means for tying said wheel holding devices together and thus compelling them to rotate around the ends of said axle, a draft bar pivoted to the vehicle frame, at a point above said axle, means connecting said draft bar to said wheel holding devices, said means slanting upwardly as the draft bar is approached and constructed to permit relative vertical movement of said axle and said frame while maintaining said wheel holding devices in parallel relation to each other.

9. In a vehicle, the combination, with a vehicle frame and a fixed axle, with springs by which said axle resiliently supports said frame, of wheel holding devices pivoted to said axle at its ends, means tying said wheel holding devices and compelling them to rotate around the ends of said axle, a draft bar pivoted to said frame, means connecting said draft bar to said wheel holding devices, said means including links approaching each other at an obtuse angle adjacent the draft bar, the connection of said links to said draft bar and to said wheel holding devices permitting relative vertical movement of said draft bar and said axle.

10. In a vehicle, the combination, with a vehicle frame and an axle, and wheel holding means pivoted to the ends of said axle, of means for tying said wheels together whereby they are compelled to rotate around the ends of the axle to similar extents, a draft bar pivoted to the vehicle frame, a drag rocker pivoted to said draft bar, means connecting said drag rocker at opposite sides of its pivot to the wheel holding devices respectively, the drag rocker permitting the draft bar to bisect the angle between the wheels at all angles of the wheels to the vehicle frame.

In testimony whereof, I affix my signature.

TRACEY E. GEIGER.